(12) United States Patent
Richter

(10) Patent No.: US 11,263,061 B2
(45) Date of Patent: Mar. 1, 2022

(54) EFFICIENT AND SCALABLE USE OF SHARED RESOURCES

(71) Applicant: MICROSOFT TECHNOLOGY LICENSING, LLC, Redmond, WA (US)

(72) Inventor: Jeffrey Marc Richter, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 16/799,653

(22) Filed: Feb. 24, 2020

(65) Prior Publication Data

US 2021/0263784 A1    Aug. 26, 2021

(51) Int. Cl.
G06F 9/46      (2006.01)
G06F 9/52      (2006.01)

(52) U.S. Cl.
CPC ..................... G06F 9/52 (2013.01)

(58) Field of Classification Search
CPC ....................................................... G06F 9/52
See application file for complete search history.

(56) References Cited

U.S. PATENT DOCUMENTS

| | | | |
|---|---|---|---|
| 6,105,049 A | 8/2000 | Govindaraju et al. | |
| 6,108,654 A * | 8/2000 | Chan | G06F 9/52 |
| 7,107,267 B2 | 9/2006 | Taylor | |
| 7,143,410 B1 | 11/2006 | Coffman et al. | |
| 9,215,232 B2 | 12/2015 | Fu et al. | |
| 2003/0145210 A1 * | 7/2003 | Taylor | G06F 9/52 713/182 |
| 2006/0048149 A1 * | 3/2006 | Clift | G06F 9/52 718/100 |
| 2016/0119291 A1 | 4/2016 | Zollinger et al. | |
| 2019/0007419 A1 | 1/2019 | D et al. | |

OTHER PUBLICATIONS

"Improved token refresh logic #6435", Retrieved from: https://github.com/Azure/azure-sdk-for-go/pull/6435/files, Retrieved Date: Dec. 3, 2019, 3 Pages.

"Optimizing OAuth Requests", Retrieved from: https://web.archive.org/web/20191108043837/https:/developers.google.com/google-ads/api/docs/oauth/optimizing-requests, Nov. 8, 2019, 5 Pages.

Ramachandran, et al., "Resource Efficient Deployment of Multiple Hot Patches", Application as Filed in U.S. Appl. No. 16/010,350, filed Jun. 15, 2018, 26 Pages.

* cited by examiner

*Primary Examiner* — Gregory A Kessler
(74) *Attorney, Agent, or Firm* — Ogilvie Law Firm

(57) ABSTRACT

Threads of a process require a shared resource to perform their work. The threads have a shared object, which might include a lock and an expiration time. When the resource has not been acquired and any one of the threads attempts to access the shared resource, that thread locks the lock, acquires the shared resource, sets the expiration time, releases the lock, and then uses the shared resource to perform its work. When any one of the threads requires the resource and the resource has been acquired but the expiration time is within a time threshold, only that thread refreshes the resource, resets the expiration time, and uses the resource to perform its work. When any of the threads require the resource and the resource is available and not expired, the thread uses the shared resource.

20 Claims, 7 Drawing Sheets

160

```
import (
        "sync"
        "time"
)

type expiringResource struct {
        // "cond" is type of lock used to synchronize access to the shared resource embodied by the remaining fields
        cond *sync.Cond // "acquiring" indicates that some thread/go routine is in the process of acquiring/updating the resource
        acquiring bool // "resource" contains the value of the shared resource
        resource someResource // "expiration" indicates when the shared resource expires; it is 0 if the resource was never acquired
        expiration time.Time
} func newExpiringResource() *expiringResource {
        return &expiringResource{cond: sync.NewCond(&sync.Mutex{})}
}
```

FIG. 5

```
func (er *expiringResource) getResource() (someResource, error) {
        // If the resource is expiring within this time window, update it eagerly.
        // This allows other threads/goroutines to keep running by using the not-yet-expired
        // resource value while one thread/goroutine updates the resource.
        const window = 2 * time.Minute // This example updates the resource 2 minutes prior to expiration now, acquire, resource := time.Now(), false, someResource("")
        // acquire exclusive lock
        er.cond.L.Lock()
        for {
                if er.expiration.IsZero() || er.expiration.Before(now) {
                        // The resource was never acquired or has expired
                        if !er.acquiring {
                                // If another thread/goroutine is not acquiring/updating the resource,
                                // then this thread/go routine will do it
                                er.acquiring, acquire = true, true
                                break
                        }
                        // Getting here means that this thread/go routine will wait for the updated resource
                } else if er.expiration.Add(-window).Before(now) {
                        // The resource is valid but is expiring within the time window
                        if !er.acquiring {
                                // If another thread/goroutine is not acquiring/renewing the resource,
                                // then this thread/go routine will do it
                                er.acquiring, acquire = true, true
                                break
                        }
                        // This thread/goroutine will use the existing resource value while another updates it
                        resource = er.resource
                        break
                } else {
                        // The resource is not close to expiring, this thread/go routine should use its current value
                        resource = er.resource
                        break
                }
                // If we get here, wait for the new resource value to be acquired/updated
                er.cond.Wait()
        }
        er.cond.L.Unlock() // Release the lock so no threads/go routines are blocked if acquire {
                // This thread/goroutine has been selected to acquire/update the resource
                resource, expiration, err := acquireResource()
                if err != nil {
                        return someResource(""), err
                }

// Atomically, update the shared resource's new value & expiration.
                er.cond.L.Lock()
                er.resource, er.expiration = resource, expiration
                er.acquiring = false // Indicate that no thread/goroutine is currently acquiring the resrouce // Wake up any waiting threads/goroutines since there is a resource they can ALL use
                er.cond.L.Unlock()
                er.cond.Broadcast()
        }
        return resource, nil // Return the resource this thread/goroutine can use
}

// acquireResource acquires or updates the resource; only one thread/goroutine at a time ever calls this function
func acquireResource() (newResource someResource, newExpiration time.Time, err error) {
        // TODO: Put code to acquire/update the resource here...
        return someResource("new value"), time.Now().Add(time.Hour), nil
}
```

EFFICIENT AND SCALABLE USE OF SHARED RESOURCES

BACKGROUND

Many software applications require an external resource to perform work. Some types of applications may also have many worker threads, executing in parallel, that require the same external resource to do their respective individual work. When the resource is available, the worker threads do their work using the resource and there are no resource-related problems. However, if the resource is unavailable, for instance if it has not yet been acquired or if it has expired, then, as only the inventor has recognized, there can be inefficiencies with how the shared resource is managed by the worker threads.

To understand some of the potential inefficiencies, consider an example application, for instance as shown in FIG. 1. In this example, the application is a server process 100 executing on a device or a cloud service. The server process receives requests from client devices 102, and the worker threads 104 service the requests. In this example, to service the client requests, the worker threads need to access a helper service 110 on another device or cloud service.

To access the helper service 110, however, the worker threads 104 must authenticate with the helper service. The authentication mechanism in this example is a brokered or delegated authentication protocol, where an entity (e.g. a worker thread) authenticates with a broker (a resource provider 106), the broker provides the entity with a security token (the shared resource 105), and the entity presents the token to another service (e.g. the helper service 110) for authentication. The entity is then granted access to the helper service.

Continuing the example, as noted, the server process 100 has a pool of worker threads 104 for handling incoming client requests. When a request is received from a client 102, a worker thread is assigned to handle the request. To do its work, the worker thread needs to access the helper service 110. The worker thread checks to see if a token (shared resource 105) is available before accessing the helper service. If a token is not available, e.g., no token exists or a token is expired, then the worker thread will present credentials to authenticate with the broker, which provides a new token or refreshes an existing token. The worker thread then provides the new/refreshed token to the helper service to authenticate with same and finish servicing the client request.

In the state of the art, although the worker threads might share the same shared resource, they operate autonomously with respect to managing shared resources like security tokens. In the example above, if the server process has just started, there may be no shared token at all. Or, if the server process has been idle for a long time then a shared token may be expired. In these circumstances, as only appreciated by the Inventor, if the server process receives a burst of client requests, then many worker threads may attempt to acquire a new token (or refresh an existing token) at the same time, which can create resource contention, local and remote load spikes, etc. Moreover, as only the inventor has appreciated, this scenario involves significant duplication of effort and therefore inefficient use of computing resources at both ends. Even if the token is shared among the worker threads, each thread is duplicating the token acquisition/refresh effort of the other threads. Not only are there implications for physical resources, there may be cost implications. For example, if the broker service charges money for each token issuance/refresh, then the cost in the scenario described is also multiplied.

What is needed is an approach that allows threads to cooperatively manage a shared resource in ways that reduce overhead.

SUMMARY

The following summary is included only to introduce some concepts discussed in the Detailed Description below. This summary is not comprehensive and is not intended to delineate the scope of the claimed subject matter, which is set forth by the claims presented at the end.

Threads of a process require a same resource to perform their work. The threads have a shared object, which might include a lock and an expiration time. When the resource is not available (has not been acquired or has expired) and any one of the threads attempts to access the shared resource, that thread locks the resource, acquires and updates the shared resource, sets the expiration time, and then releases the lock so that all of the threads (including itself) can use the newly-acquired shared resource to perform their work. When any one of the threads requires the resource and the resource is available but the expiration time is within a time threshold, a single thread is selected to refresh the resource. The selected thread refreshes the resource and updates the expiration time; all other threads continue to use the soon-to-be expired shared resource, which facilitates scalability and performance. When any of the threads require the resource and the lock is locked, the thread blocks on the lock and uses the resource when the lock is released.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

FIG. 5 shows a first portion of Go code for implementing a shared object and the shared resource management code.

FIG. 6 shows a second portion of Go code for implementing the shared object and shared resource management code.

DETAILED DESCRIPTION

Figure 1:
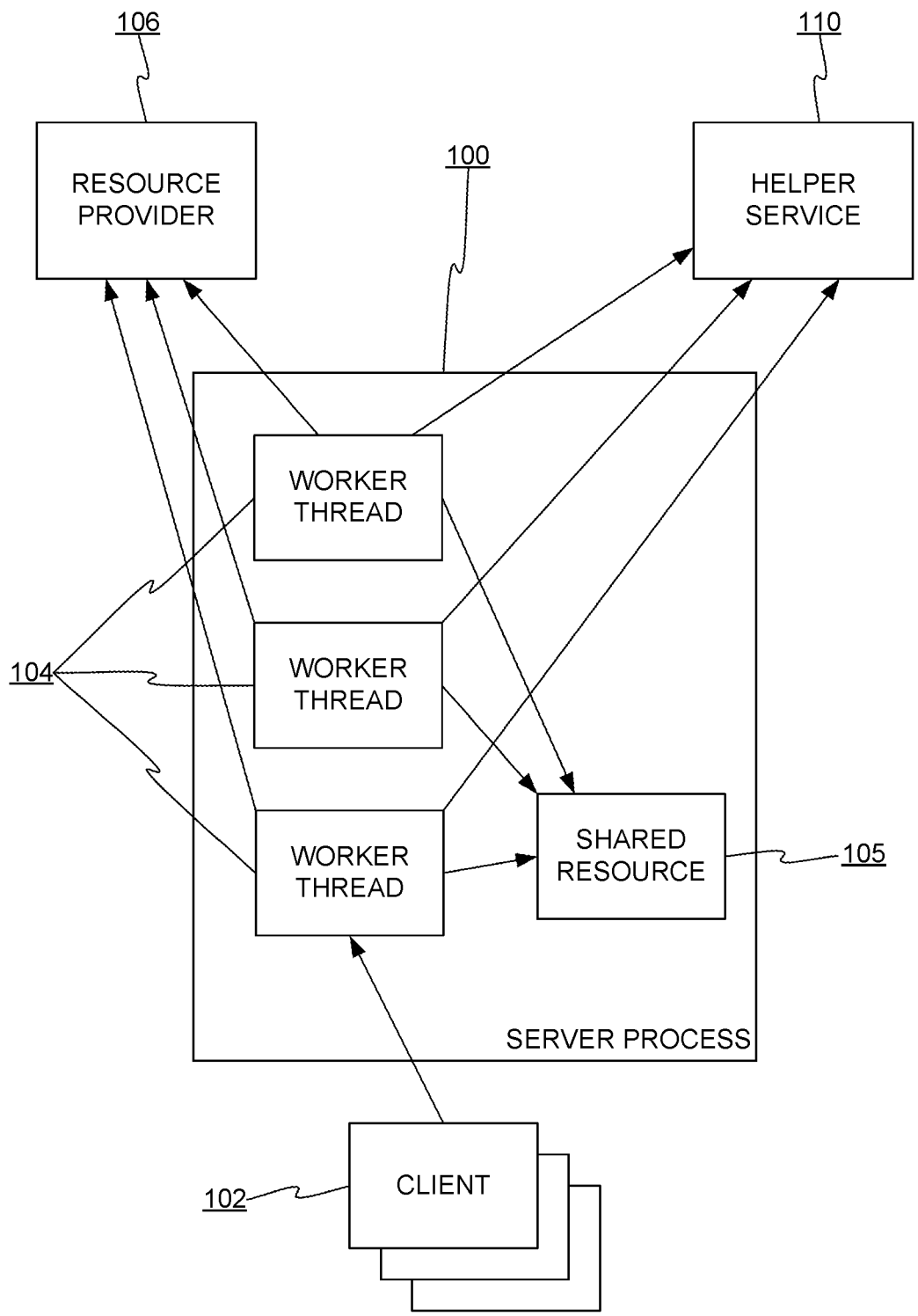
FIG. 1 shows a prior art server process.
Figure 2:
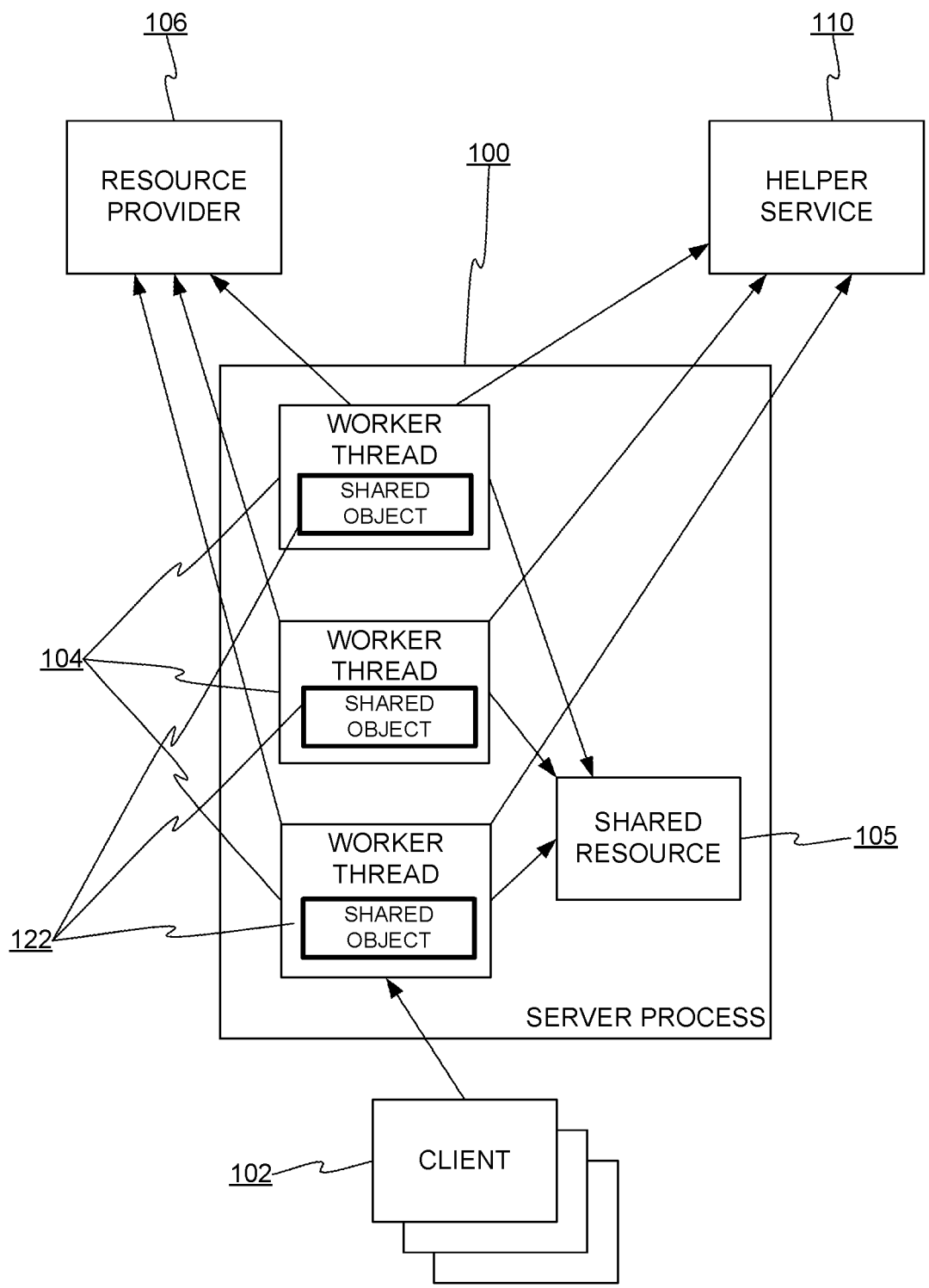
FIG. 2 shows an improved server process

FIG. 2 shows an improved server process 100, similar to the server process discussed in the Background. The server process 100 executes on a computing device and services requests from clients 102. The server process is an operating system object managed by an operating system executing on the computing device. The clients 102 may be on the same computing device or on another computing device. In one embodiment, the clients 102 are web browsers, the server process 100 is a web server, and the server and clients communicating using the hypertext transfer protocol (HTTP). However, the techniques described herein may be used for any application-layer software. The server process 100 performs work to handle the client requests and returns results such as requested information to the clients.

To allow the server process 100 to service client requests in parallel, the server process 100 has worker threads 104. As used herein, the term "thread" refers to any executable unit of code that a process can instantiate to run in parallel with the process and other such executable units. While threads per se are a common example, some languages employ other constructs. For instance, the Go language uses goroutines. The server process 100 may instantiate a fixed number of worker threads 104 upon startup, or it may scale the number of worker threads to match changing load. When a new client request arrives, the server process assigns the request to a worker thread. Each worker thread 104 includes a shared object 122. The shared object, discussed below, enables the worker threads 104 to coordinate to collectively manage the shared resource 105.

When a worker thread receives a client request it performs some work to satisfy the request. In the course of its work, the worker thread reaches a point where it requires the shared resource 105 to perform the work. The resource is shared in the sense that all of the worker threads have the ability to manage and access the same resource via the shared object 122. The shared resource can be any type of information within the context of the server process 100. For example, the shared resource might be a security token, a record from a database service, Uniform Resource Locator (URL), a hostname-address mapping, etc. In many cases, the resource may need to be obtained from a resource provider 106 beyond the server process, although the resource provider may execute on the same device as the server process 100. When the resource is obtained from another device or a cloud service, the latency and overhead related to acquiring and maintaining the resource can be significant. As noted in the Background, if many worker threads try to acquire or refresh the shared resource at the same time, the overhead can be significant.

In some embodiments, the shared resource 105 has a limited lifetime, i.e., an expiration time upon which the shared resource may become invalid or inoperable. If the resource is obtained externally, then the external resource provider will keep track of the expiration time and treat usage of the resource accordingly. In the case of a security token, an authentication broker might refuse to validate a security token that it determines is expired. If the shared resource expires and the worker threads are not cooperating, many threads attempting to refresh the same resource can cause the same latency and overhead problems as initially acquiring the resource in an uncooperative fashion.

In some embodiments, the worker threads 104 use the shared resource to communicate with a helper service 110. The helper service 110 may be another web server, a cloud service, another host, etc. When a worker thread needs information from the helper service, it uses the shared resource. If the shared resource 105 is a network address, the worker thread will communicate with a helper service at that address. If the shared resource is a security token, the worker thread will send the shared token resource to the helper service, thus authorizing the worker thread to access the helper service. If management of the shared resource is not coordinated among the threads, there can be additional problems. If the worker thread attempts to access the helper service with an expired security token, then refreshes the token and tries again, there is additional avoidable overhead and latency communicating with the helper service.

Figure 3:
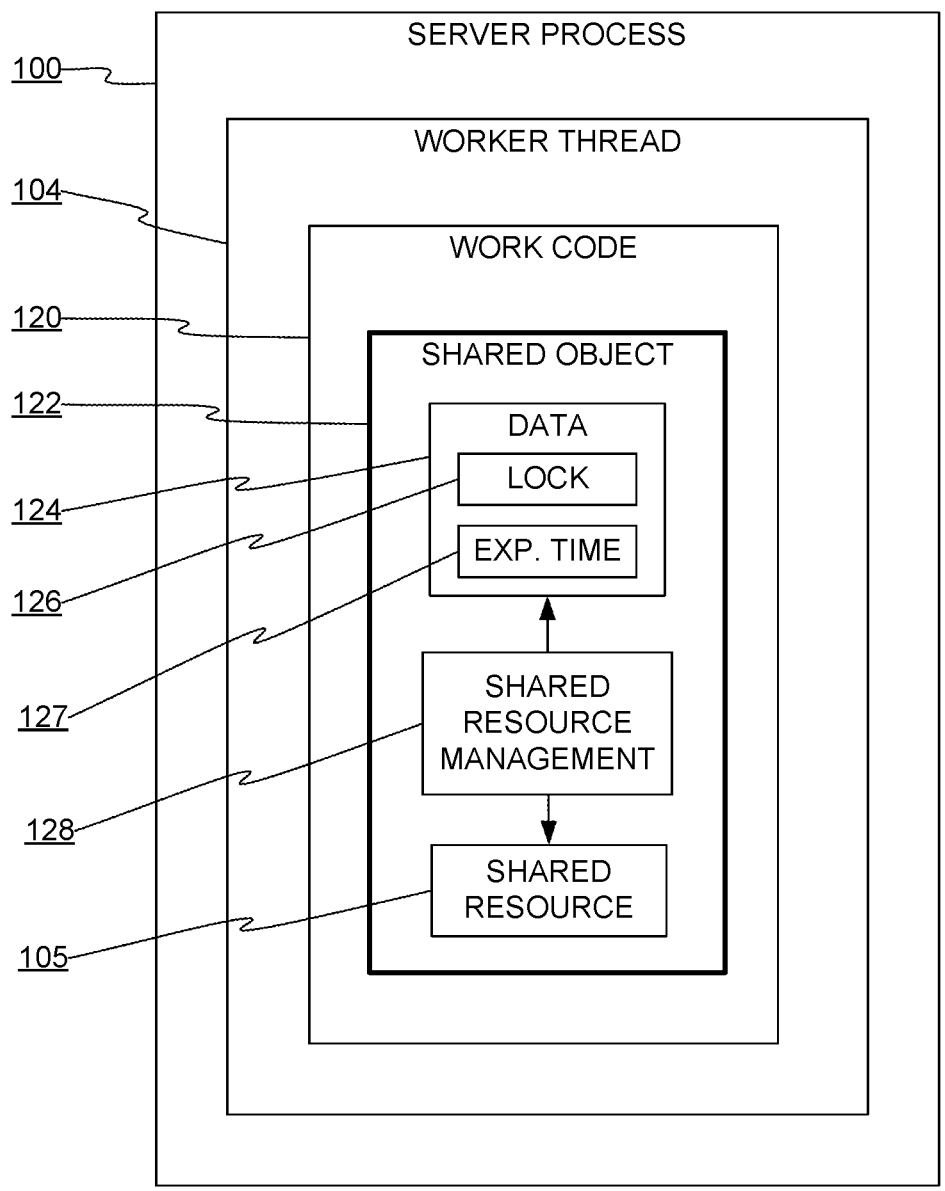
FIG. 3 shows details of a worker thread.

FIG. 3 shows details of a worker thread 104. All of the worker threads 104 on the server process 100 will comprise the same code, but each will have their own data. That is, the worker thread shown in FIG. 3 is representative of the other worker threads. The worker thread 104 has some work code 120 that does the work required to service a client request. The work code includes a shared object 122. Each worker thread has a reference to the same shared object 122. That is each worker thread sees the same data 124 contained by the shared object.

The shared object includes the data 124, which includes a lock 126 and expiration time 127. The data 124 may include other variables or members, discussed later, which are used for managing the shared resource 105. The shared object also includes shared resource management code 128. The shared resource management code 128 uses the data and lock to allow the worker threads to manage the shared resource in an efficient and coordinated manner. Additional details are discussed below with reference to FIGS. 5 and 6.

Figure 4:
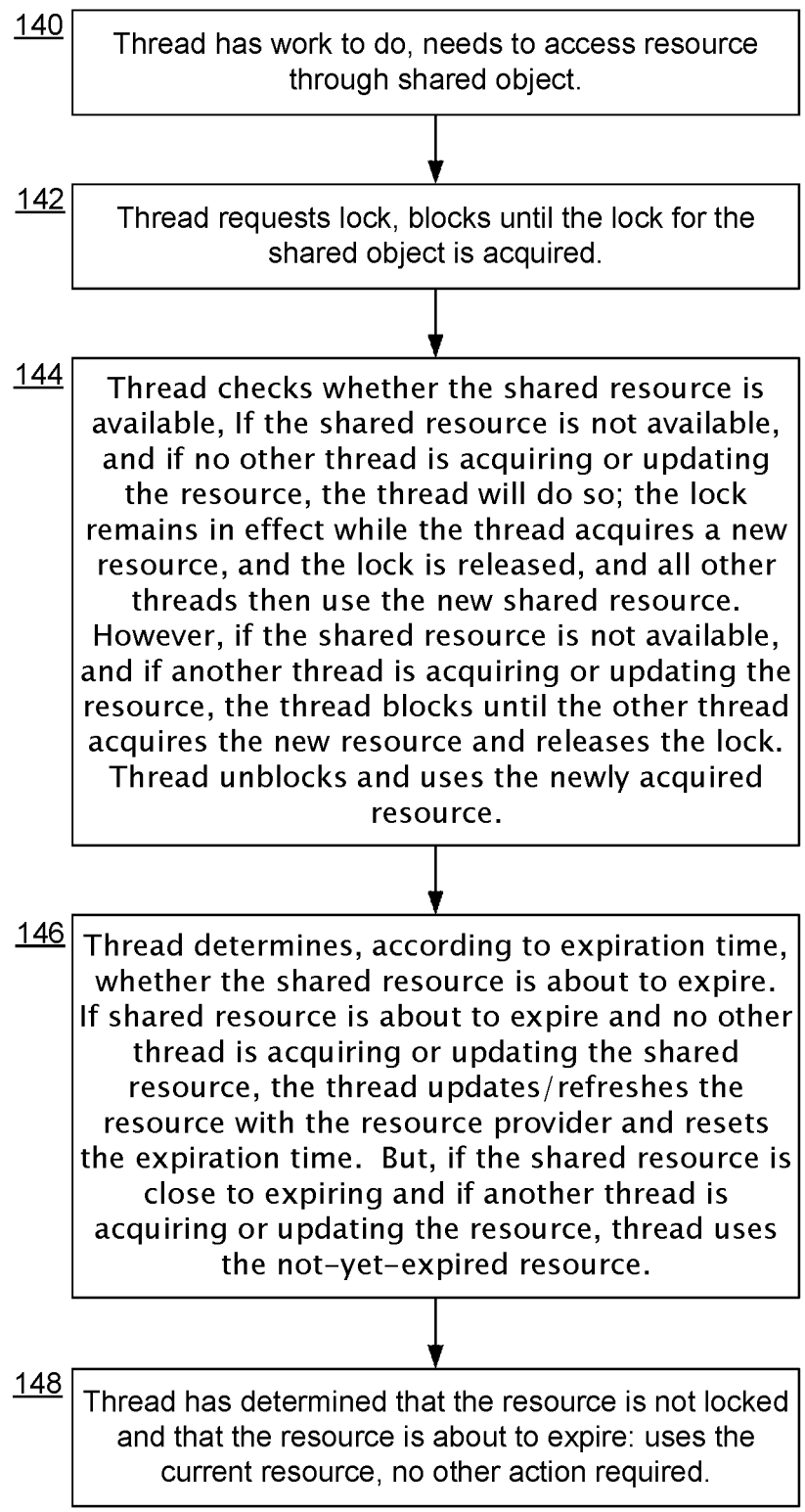
FIG. 4 shows a process performed by shared resource management code.

FIG. 4 shows a process performed by the shared resource management code 128. At step 140 a worker thread 104 is performing work, e.g. by working code 120. The working code 120 executes an instruction or statement that attempts to access the shared resource 105. This may cause the working code 120 to start executing the shared resource management code 128.

At step 142, the shared resource management code attempts to lock the lock 126. If the lock is in effect, then the worker thread blocks until the lock is released by whichever other thread holds the lock. Whether the thread blocked or not, once the lock is acquired, the thread continues.

At step 144, the thread checks to see whether the shared resource is available, that is, whether the shared resource has been acquired and whether, according to the expiration time 127, the shared resource has not expired. In a first case, if the shared resource is not available, and if no other thread is acquiring or updating the resource, the thread will do so. The lock remains in effect while the thread acquires a new resource from the resource provider 106. The new resource is copied into the shared object, the expiration time is updated, and the lock is released. All other threads will then use the new shared resource. However, in a second case, if the shared resource is not available, and if another thread is acquiring or updating the resource, the thread blocks until the other thread acquires the new resource and releases the lock. The thread unblocks and uses the newly acquired resource.

At step 146 the thread determines, according to the expiration time, whether the shared resource is about to expire. If the shared resource is about to expire and no other thread is acquiring or updating the shared resource, the thread will update or refresh the resource with the resource provider and reset the expiration time. On the other hand, if the shared resource is close to expiring and if another thread is acquiring or updating the resource, the thread proceeds to use the not-yet-expired resource.

At step 148, the resource has been determined to be available and not about to expire, so the thread, and all other threads use the current resource and no other action is required.

FIG. 5 shows a first portion of Go code 160 for implementing the shared object 122 and shared resource management code 128. In the example shown in FIGS. 5 and 6, the shared resource 105 is someResource (an example of which could be a security token), the lock 126 is implemented as a condition variable (as used herein "lock" refers to any synchronization mechanism that will enable the thread coordination described herein), and the shared resource management code 126 is implemented by the functions shown in FIGS. 5 and 6. The code defines a structure, or shared object, (expiringResource) for storing the resource, tracking expiration of the resource (expiration), storing the condition or lock variable (cond), a Boolean variable (acquiring) for indicating whether the resource is in the process of being acquired/updated. The first portion of the Go code also includes a function to generate a new instance of the shared object/structure.

FIG. 6 shows a second portion of Go code 170 for implementing the shared object 122 and shared resource management code 128. A function or method (getResource) is called by the work code 120. First, a short time window is created to allow callers to continue to use the old token while a potential token refresh occurs.

The lock is requested or the thread blocks if the lock is not available. Then, a loop is entered, which starts with several conditions. If the resource was never obtained or has expired, and if the acquiring Boolean indicates that no other thread is acquiring the resource, then flags for acquiring and getting the resource are set and the loop is exited. If the resource is within the expiration window, then the same steps occur; the acquiring and acquire flags are set to true and the loop breaks. If the preceding conditionals are not true, then the token is ready to use with no extra steps; the resource is copied and the loop is broken.

After the loop is exited, the lock is released. If the acquire flag is set then the function gets the resource, updates the various shared state variables. Finally, a shared context that includes the resource is returned.

Figure 7:
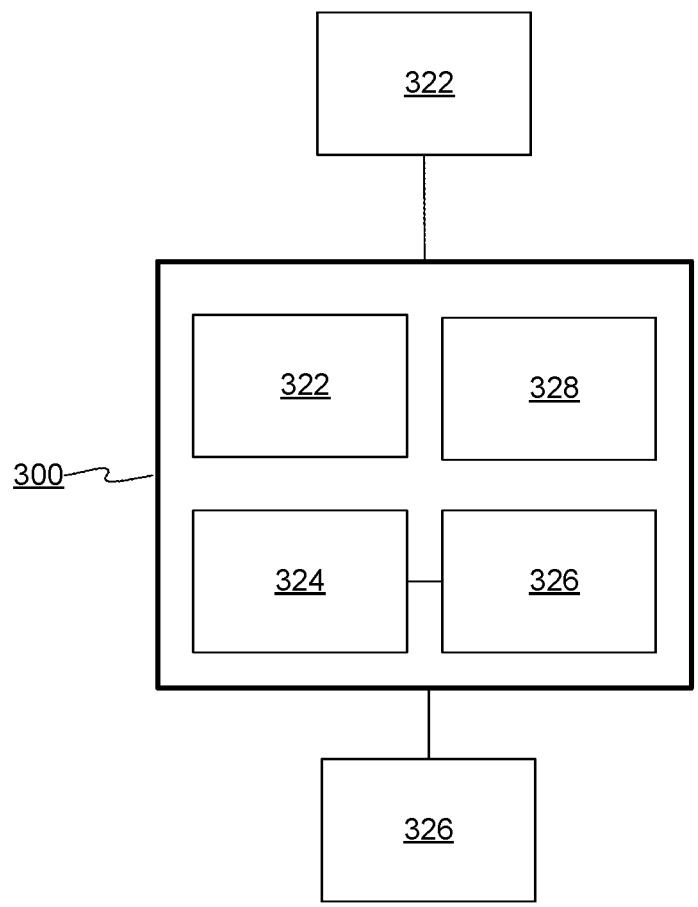
FIG. 7 shows details of a computing device.

FIG. 7 shows details of a computing device 300 that can host any of the processes or services discussed above. The technical disclosures herein will suffice for programmers to write software, and/or configure reconfigurable processing hardware (e.g., field-programmable gate arrays (FPGAs)), and/or design application-specific integrated circuits (ASICs), etc., to run on the computing device 300 to implement any of the features or embodiments described herein.

The computing device 300 may have one or more displays 322, a network interface 324 (or several), as well as storage hardware 326 and processing hardware 328, which may be a combination of any one or more: central processing units, graphics processing units, analog-to-digital converters, bus chips, FPGAs, ASICs, Application-specific Standard Products (ASSPs), or Complex Programmable Logic Devices (CPLDs), etc. The storage hardware 326, which may be local and/or remote, may be any combination of magnetic storage, static memory, volatile memory, non-volatile memory, optically or magnetically readable matter, etc. The meaning of the term "storage", as used herein does not refer to signals or energy per se, but rather refers to physical apparatuses and states of matter. The hardware elements of the computing device 300 may cooperate in ways well understood in the art of machine computing. In addition, input devices may be integrated with or in communication with the computing device 300. The computing device 300 may have any form-factor or may be used in any type of encompassing device. The computing device 300 may be in the form of a handheld device such as a smartphone, a tablet computer, a gaming device, a server, a rack-mounted or backplaned computer-on-a-board, a system-on-a-chip, or others.

Embodiments and features discussed above can be realized in the form of information stored in volatile or non-volatile computer or device readable storage hardware. This is deemed to include at least hardware such as optical storage (e.g., compact-disk read-only memory (CD-ROM)), magnetic media, flash read-only memory (ROM), or any means of storing digital information in to be readily available for the processing hardware 328. The stored information can be in the form of machine executable instructions (e.g., compiled executable binary code), source code, bytecode, or any other information that can be used to enable or configure computing devices to perform the various embodiments discussed above. This is also considered to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprising processing hardware and storage hardware, the method comprising:
executing a process comprising threads, wherein a shared object is shared among the threads, wherein the shared object comprises a lock, and wherein the process comprises:
executing work code that, when executed, performs work using a shared resource;
based on performing the work, acquiring the shared resource by:
if the lock is locked, blocking until it is released;
if the shared resource is available and the lock is not locked, acquiring the shared resource and performing the work with the shared resource; and
if the shared resource is unavailable and the lock is not locked, then locking the lock, acquiring the shared resource from a source external to the process, unlocking the lock, and performing the work with the shared resource;
wherein the shared object further includes a time window variable corresponding to refreshing the shared resource, and wherein acquiring the shared resource further comprises: if the time window variable indicates that a current time is within the time window, then refreshing the shared resource with the external source, locking the lock, resetting the time window variable, and releasing the lock.

2. A method according to claim 1, wherein use of the lock by the threads prevents more than one thread at a time from resetting an expiration time of the shared resource.

3. A method according to claim 1, wherein the source external to the process comprises a second server process or a cloud service.

4. A method according to claim 3, wherein the source external to the process generates an expiration time for the shared resource when providing the shared resource to the process, and wherein the shared resource becomes invalid at the source external to the process when the expiration time is reached.

5. A method according to claim 1, further comprising receiving, by the server process, client requests sent by clients, distributing the client requests to the threads, servicing the client requests by the threads accessing the shared resource, and returning responses to the clients.

6. A method according to claim 5, wherein sharing the lock among the threads prevents more than one thread at a time from acquiring or updating the shared resource.

7. A method according to claim 6, wherein when one of the threads is acquiring or updating the shared resource the other threads will block if they attempt to acquire the shared resource.

8. A method according to claim 1, wherein the lock comprises a condition variable, and wherein the shared object comprises a Boolean variable that is used to indicate if a thread has been selected to update the shared resource.

9. A computing device comprising:
storage hardware storing instructions;
processing hardware that, when executing the instructions, performs a process comprising:
executing a process comprising threads, each thread comprising a shared object that stores a resource and an expiration time of the resource, each thread having a lock associated with the shared object, each thread configured to perform respective work using the resource;
when any of the threads require the resource to perform the work, the thread blocks on the lock if the lock is locked;
when any of the threads determine that the resource is available, the thread uses the resource to perform the work;
when any of the threads determine that the resource is not available, the thread locks the lock, acquires the resource from a source external to the process comprising threads, sets the expiration time accordingly, and then unlocks the lock;
when any of the threads determine that the expiration time is below a threshold, the thread communicates with the external resource to renew the resource, then locks the lock to reset the expiration time, and then unlocks the lock; and
wherein the process comprising threads is further characterized in at least one of the following ways: use of the lock by the threads prevents more than one thread at a time from resetting the expiration time, or one thread updates the resource with the external resource while another thread uses the resource.

10. A computing device according to claim 9, wherein the resource is used by the threads to access a helper service executing on another computing device.

11. A computing device according to claim 9, wherein the process executes as part of a first cloud service, and wherein the external resource comprises a second cloud service.

12. A computing device according to claim 9, wherein the expiration time is set according to an indication of same received from the external resource, and wherein the resource becomes invalid at the external resource at the expiration time unless one of the threads instructs the external resource to update or renew the resource.

13. A computing device according to claim 9, wherein use of the lock by the threads prevents more than one thread at a time from acquiring the resource.

14. A computing device according to claim 9, wherein the computing device comprises a network interface, and wherein use of the lock by the threads prevents more than one thread at a time from resetting the expiration time.

15. A computing device according to claim 9, wherein the computing device comprises a network interface, and wherein one thread updates the resource with the external resource while another thread uses the resource.

16. A computing device according to claim 9, wherein the lock comprises a member of a condition variable.

17. Computer storage hardware storing information configured to cause one or more computers to perform a process, the process comprising:
executing a process managed by an operating system, the process managed by the operating system comprising worker threads and a shared resource;
providing the shared resource, which is shared among the threads, wherein the threads use the shared resource to perform respective tasks;
initially acquiring the shared resource from a source outside the process managed by the operating system when any one of the threads requires the shared resource by any one of the threads: acquiring the resource from the source outside the process managed by the operating system, setting an expiration time for the shared resource, copying the shared resource, and then signaling the other threads that the shared resource is available, wherein any other thread that requires the shared resource during the initial acquiring will: block until signaled that the shared resource is available, and then access the shared resource;
refreshing the shared resource when any of the threads require the shared resource and a current time is within a threshold amount of time from the expiration time by any one of the threads: refreshing the shared resource with the source outside the process managed by the operating system, and excluding the other threads from using the expiration time while resetting the expiration time, wherein any other thread can access the shared resource while the shared resource is being refreshed; and
when any of the threads require the shared resource and the shared resource is available and the current time is not within the threshold of the expiration time, the thread accesses the shared resource.

18. Computer storage hardware according to claim 17, wherein the shared resource comprises a security token that the threads provide to a cloud service to authenticate with the cloud service.

19. Computer storage hardware according to claim 17, wherein the expiration time is shared among the threads and all threads check the expiration time against the current time when accessing the shared resource.

20. Computer storage hardware according to claim 17, wherein when the shared resource is available to the threads, each time a thread needs to access the shared resource the thread checks the expiration time to determine if the shared resource needs to be updated or renewed.

* * * * *